July 16, 1946.　　　　H. L. COATS　　　　2,404,041
APPLICATOR FOR BELT FASTENERS
Filed Dec. 6, 1944
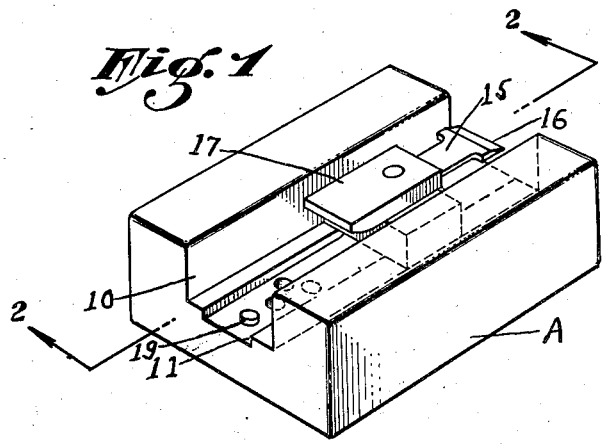
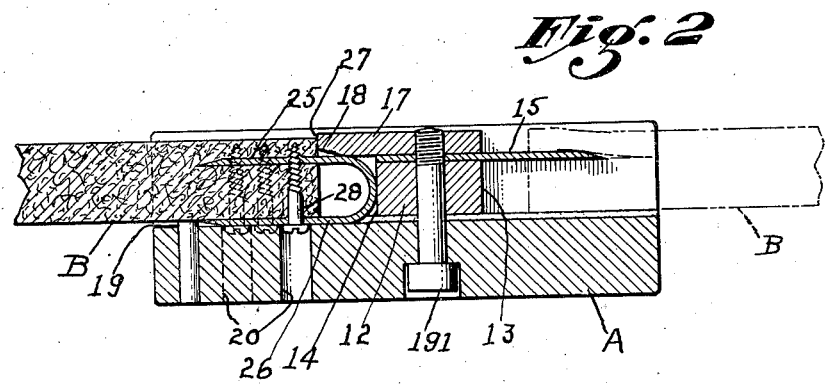
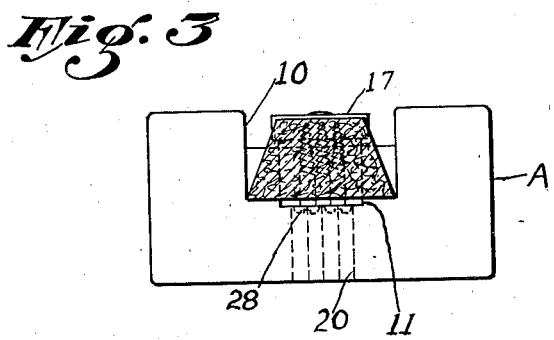
Inventor:
HUGH L. COATS,
By Joseph Harris
Attorney.

Patented July 16, 1946

2,404,041

UNITED STATES PATENT OFFICE 2,404,041

APPLICATOR FOR BELT FASTENERS

Hugh L. Coats, Wheaton, Ill., assignor to Flexible Steel Lacing Company, Chicago, Ill., a corporation of Illinois Application December 6, 1944, Serial No. 566,911

9 Claims. (Cl. 69—20)

This invention relates to improvements in applicators for belt fasteners and, more specifically, to applicators for the attaching members of V belt fasteners.

In the more common type of hinged V belt fasteners, it is the general practice to employ two U-shaped attaching members, each attached to an end of the belt, the loop ends of the members being interdigitated and connected by a hinge pin or pintle. In the particular type of V belt fastener with which the present applicator is especially concerned, the U-shaped attaching members are applied to the belt ends by placing one of U arms on the outer wide face of the V belt and inserting the other arm lengthwise into the belt material. The two arms are then secured to the belt by screws or similar retainer elements inserted through alined holes in the two arms and through the intervening belt materials. Because of the necessity of inserting one of the attaching member arms within the belt material, much care must be exercised in inserting the same accurately both as to length and distance from the outside face of the belt and also in proper alignment with the belt.

One object of the present invention, therefore, is to provide a simple, inexpensive device, manually operated for initially slitting V belt ends for reception of the attaching members and thereafter applying the attaching members in proper location for reception of the securing screws or elements, the device being further characterized by the fact that it is provided with guides for the screws or elements to insure their accurate alignment while being pushed through the belt material from the outside arm of the attaching member to and into the embedded arm.

Another object of the invention is to provide an applicator of the character indicated in the preceding paragraph which is entirely free of any moving parts.

Other objects of the invention will more fully appear from the description and claims hereinafter following taken in connection with the accompanying drawing.

In said drawing, Figure 1 is a perspective view of the device showing one embodiment of the invention. Figure 2 is a longitudinal sectional view corresponding to the line 2—2 of Figure 1 and showing an attaching member applied to a belt end. And Figure 3 is an end view of the device.

In the drawing, the applicator is shown as comprising a main block A of a size that will conveniently fit the hand, said block being of generally rectangular form and having a longitudinally extending guiding channel 10 extending from end to end thereof. Said channel is of a width corresponding to the maximum width or outer side of the V belt for which it is to be used so that the belt end may be dropped into the channel. At the bottom of the channel 10 is a groove 11, also preferably extending the length of the block A. The groove 11 is centrally located and of a width and depth corresponding to the width and thickness of the outside positioned arm of the U-shaped attaching member, hereinafter more specifically referred to.

Within the channel 10, and preferably nearer one end than the other, is an abutment block 12 having opposed abutment or limiting stop faces 13 and 14. Mounted on the block 12 and extending to the right thereof, as viewed in Figure 2 is a slitting knife 15 having a cutting edge 16 at its outer end of the desired width corresponding to the width of that arm of the attaching member which is to be inserted in the belt material and the cutting edge 16 is extended beyond the abutment or limiting stop face 13 a distance corresponding to the extent to which said arm of the attaching member is to be inserted within the belt end. As will also be understood, the knife 15 is disposed at such distance above the bottom of the channel 10 as to enter the belt end at the desired distance from the outer face of the belt to receive the embedded arm of the attaching member.

Also mounted on the block 12 and on top of the knife 15, is a retainer plate 17 extending from the opposite side of the block 12, said plate 17 having a preferably beveled under face 18 at its outer end to facilitate insertion of the attaching member thereunder as shown in Figure 2. The block 12, knife 15 and plate 17 may be held in place by any suitable means such as the screw 191 entered through the bottom of the main block A and having threaded engagement with the plate 17 so that all parts may be securely clamped in place.

At the left hand end of the main block A, as viewed in Figure 2, a limiting stop pin 19 is provided in the groove 11, the pin 19 being located a distance from the limiting stop face 14 corresponding to the end of the outer arm of the attaching member when the loop end of the latter is abutting the face 14 as shown in Figure 2. Also provided in the main block A, are guide holes 20—20 for the securing screws, said holes 20—20 being located in the groove 11 to accurately align with the corresponding holes in the arms of the attaching member when the latter is retained in the position shown in Figure 2.

The applicator is employed in the following manner. The end of the belt, such as indicated at B in Figure 2, is first pushed endwise against the knife 15 until the belt engages the limiting stop face 13, the belt end sliding on the bottom of the guide channel 10 during this operation which obviously can be carried out by the operator holding and pushing the applicator with one hand while holding the belt end in the other hand.

This operation serves to pre-slit the belt end to the proper depth and level for the subsequent reception of the insertable arm 25 of the attaching member shown in Figure 2. During the pre-slitting operation, the groove 11, which is directly beneath the knife 15, has been found to serve a very desirable function, in that it permits the belt material to swell downwardly, thus preserving the proper level for the cut.

The operator then places the attaching member in position shown in Figure 2, that is, with the loop end against the face 14 and with the outer arm 26 in the groove 11 and its end against the stop pin 19, the plate 17 meanwhile holding the attaching member in place. The pre-slit belt end is then pushed endwise toward the attaching member until the squared end of the belt engages the end 27 of the plate 17 which also functions as a limiting stop as will be obvious. The attaching arm 25, which ordinarily will have a somewhat tapered or sharpened end as shown, will thus be embedded in the belt end the desired distance, leaving the loop of the U-shaped attaching member extended the correct amount for co-operation with a complemental member and hinge pin.

With the attaching member and belt end assembled as shown in Figure 2, the assembly is then turned over and the screws of other retaining elements 28 entered and guided through the guide holes 20 which are in alignment with the holes in the arms 25 and 26 of the attaching member as will be understood. The belt end with the attaching member secured thereto is then removed from the applicator.

From the preceding description it will be seen that the improved applicator is of the utmost simplicity involving no movable parts: is entirely manual in operation; insures proper and accurate application of the attaching member; and facilitates and insures accurate insertion of the retaining screws while being driven through the belt material from one arm to the other of the attaching member.

Although there has herein been shown and described what is now considered the preferred embodiment of the invention, the same is merely illustrative and all changes and modifications are contemplated that come within the appended claims.

What is claimed is:

1. An applicator for U-shaped attaching members of a V belt fastener, comprising: a main member having guiding means for a V belt end; a knife cooperable with said guiding means to pre-slit a V belt end when moved along said guiding means against the knife; means for retaining an attaching member of a V belt fastener in position on said main member while the pre-slit belt end is moved toward said attaching member and one arm thereof inserted in the pre-slit; and means for limiting the extent to which the belt end may be moved toward the knife and said retaining means.

2. An applicator for U-shaped attaching members of a V belt fastener, comprising: a main member; a knife rigid with said member; means also rigid with said member for retaining an attaching member of a V belt fastener in position on said main member; means for guiding a belt end while being moved against said knife and toward said retaining means; and means for limiting the movement of the belt end in each of said movements.

3. An applicator of the character described, comprising: a block; a knife secured to the block; means on the block for guiding and limiting the movement of a V belt end toward said knife; fixed retaining means on said block for a U-shaped attaching member of a V belt fastener; and means on the block for guiding and limiting the movement of a belt end toward an attaching member retained in position by said retaining means.

4. An applicator according to claim 1 wherein said main member is provided with guide holes aligned with openings in the arms of the attaching member when the latter is in retained position.

5. An applicator of the character described, comprising: a block having a channel extending longitudinally thereof to serve as a guide for a V belt end; a knife aligned with said channel and disposed therein; a retainer plate aligned with said channel to maintain an attaching member of a V belt fastener in position, and means for limiting the movement of a belt end toward said knife and toward an attaching member in retained position while the belt end is guided by said channel.

6. An applicator according to claim 5 wherein said block is provided with guide recesses for entering retaining elements through the attaching member while in retained position.

7. An applicator of the character described, comprising: a block having a channel guide for a V belt extending lengthwise of the block, said channel, at one end, having a groove in the bottom thereof for the reception of an arm of a U-shaped attaching member of a V belt fastener; an abutment element within the channel intermediate its ends; a knife and a retainer plate rigidly associated with said abutment element and extending in opposite directions therefrom parallel with the channel guide, said block being provided also with guide openings for screws or the like, said openings being aligned with corresponding openings in the arms of the attaching member when in retained position.

8. An applicator of the character described, comprising: a member having a channel guide for a V belt end, said guide being of a width corresponding to the maximum width of the V belt to be operated upon and having also a depression in the bottom thereof; an abutment element at one end of said guide; a knife mounted on said member extending lengthwise of said guide from said abutment and disposed over said depression, said knife having a cutting edge at the end remote from the abutment, said depression serving to permit swelling of the belt material downwardly of the guide as the knife penetrates the belt end when moved endwise toward the knife.

9. An applicator for a U shaped attaching member of a V belt fastener, including: a main member having guiding means for a V belt end; an abutment at one end of said guiding means, the latter having a groove in the bottom thereof adjacent said abutment, said groove being of a depth and width corresponding to the depth and width of an arm of the U shaped attaching member; retaining means associated with said abutment and extending over said groove and cooperable with the latter to retain the attaching member in fixed position in the guiding means against the abutment, said main member being provided with guide openings for screws or the like, which said openings are aligned with corresponding openings in the arms of the attaching member when the latter is in said retained position.

HUGH L. COATS.